(12) United States Patent
Masumoto

(10) Patent No.: US 8,765,844 B2
(45) Date of Patent: Jul. 1, 2014

(54) RUBBER COMPOSITION, ITS MANUFACTURING METHOD AND PNEUMATIC TIRE

(75) Inventor: Yuki Masumoto, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 75 days.

(21) Appl. No.: 13/366,559

(22) Filed: Feb. 6, 2012

(65) Prior Publication Data

US 2012/0214903 A1 Aug. 23, 2012

(30) Foreign Application Priority Data

Feb. 18, 2011 (JP) ................................. 2011-033677
Feb. 18, 2011 (JP) ................................. 2011-033679

(51) Int. Cl.
C08L 15/00 (2006.01)
C08K 3/36 (2006.01)
C08K 3/34 (2006.01)

(52) U.S. Cl.
USPC ............................ 523/526; 523/150; 523/523

(58) Field of Classification Search
USPC ....................................................... 523/150
See application file for complete search history.

(56) References Cited

U.S. PATENT DOCUMENTS

| | | | |
|---|---|---|---|
| 5,504,137 A * | 4/1996 | Sandstrom et al. ............ 524/492 |
| 5,573,504 A | 11/1996 | Dorsey, III | |
| 5,733,963 A * | 3/1998 | Sandstrom et al. ............ 524/492 |
| 6,046,266 A * | 4/2000 | Sandstrom et al. ............ 524/492 |
| 7,019,084 B2 * | 3/2006 | Sandstrom ................ 525/332.6 |
| 7,122,586 B2 * | 10/2006 | Sandstrom et al. ............ 523/344 |
| 8,084,547 B2 * | 12/2011 | Obrecht ...................... 525/332.6 |
| 8,522,847 B2 * | 9/2013 | Sandstrom et al. ............ 152/450 |
| 2003/0114577 A1 * | 6/2003 | Yatsuyanagi et al. ........ 524/495 |
| 2004/0116574 A1 * | 6/2004 | Sandstrom ................... 524/424 |
| 2004/0225038 A1 * | 11/2004 | Lin et al. ....................... 524/109 |
| 2005/0222317 A1 * | 10/2005 | Yatsuyanagi et al. ......... 524/492 |
| 2007/0155861 A1 * | 7/2007 | Chen et al. .................... 523/351 |
| 2007/0155890 A1 * | 7/2007 | Chen et al. .................... 524/493 |
| 2008/0027162 A1 * | 1/2008 | Hua et al. ...................... 524/262 |
| 2008/0132608 A1 * | 6/2008 | Inoue ............................ 523/351 |
| 2009/0151830 A1 * | 6/2009 | Sandstrom et al. ........ 152/209.1 |
| 2010/0197829 A1 * | 8/2010 | Obrecht ........................ 523/353 |
| 2011/0028653 A1 * | 2/2011 | Wang et al. ................... 525/207 |

FOREIGN PATENT DOCUMENTS

| | | |
|---|---|---|
| DE | 60 2004 003 731 T2 | 10/2007 |
| DE | 10 2007 020 451 A1 | 10/2008 |
| EP | 0 763 558 A1 | 3/1997 |
| EP | 1 457 520 A1 | 9/2004 |
| JP | 10-101849 A | 4/1998 |
| JP | 2006-036918 A | 2/2006 |
| JP | 2008-138081 A | 6/2008 |
| JP | 2008-138086 A | 6/2008 |
| JP | 2010260920 A * | 11/2010 |

OTHER PUBLICATIONS

German Office Action dated Mar. 18, 2013, issued in corresponding German Patent Application No. 10 2012 100 321.1, w/ English translation.

* cited by examiner

*Primary Examiner* — James J Seidleck
*Assistant Examiner* — Peter A Salamon
(74) *Attorney, Agent, or Firm* — Westerman, Hattori, Daniels & Adrian, LLP

(57) ABSTRACT

A manufacturing method of rubber composition for tire tread or the other, which is comprised of adding 30-110 mass parts of silica powders to 100 mass parts of diene rubber component and adding silane coupling agent by 3-15 mass % of the silica powders, comprising: preparing hetero-modified SBR having hetero atom functional group; a first kneader-mixing step, in which 60-85 mass parts of the diene rubber component including no less than 20 mass % of the hetero-modified SBR is mixed in a kneader device with substantially all of the reinforcing fillers; taking out of obtained mixture to give a master batch; and second kneader-mixing step, in which the master batch is mixed substantially solely with remaining mass parts of the diene component.

9 Claims, No Drawings

RUBBER COMPOSITION, ITS MANUFACTURING METHOD AND PNEUMATIC TIRE

BACKGROUND OF THE INVENTION

The present invention relates to a rubber composition and its manufacturing method and, in more detail, relates to the rubber composition suitable for treads of tires for example, as well as a pneumatic tire obtainable by using such rubber composition. The invention especially relates to those enabling improvement in low-fuel-consumption or braking (wet-road gripping) performance on wet-road, along with wear resistance, while maintaining the braking on wet-road or low-fuel-consumption performance.

Requirement for the low-fuel-consumption performance is ever becoming stricter nowadays; and resultantly, decreasing of rolling resistance of the tire is strictly required. The rolling resistance is related to heat generation of the vulcanized rubber, and thus, in general, it is required to decrease hysteresis loss of the vulcanized rubber or suppressing of loss coefficient. Meanwhile, requirement for safety of the automobile is also high; and thus, required for the rubber composition for the tire tread is not only mere decreasing of the rolling resistance but also maintaining at high levels, of both of the low-fuel consumption and the braking performance.

To cope with such requirements, silica powders as reinforcement fillers are incorporated in the rubber composition with a high content so as to increase the braking on wet-road and low-fuel-consumption performance.

In particular, JP2008-138086A (Japan patent application publication No. 2008-138086) indicates that brittle temperature is kept low by following—"when to obtain a silica-containing rubber composition having natural and/or isoprene rubber and having other diene rubber such as SBR; the other diene rubber is firstly mixed with silica powders and so on to produce a master batch and then, the natural and/or isoprene rubber is added; in a manner to increase non-compatibility between two rubber phases and to thereby increase bipolarity of temperature variance in tan δ" (paragraph 0007).

Meanwhile, JP2006-036918A proposes following—"In first mixing step, a part of to-be-incorporated amount of rubber component is mixed in a tightly closed blender, with silica or other filler, silane coupling agent and other rubber chemicals at preset temperature, within a short time period to obtain a uniform mixture. Then, in second mixing step, obtained mixture is successively (without releasing from the blender) added with remaining part of the rubber component and further mixed for a short time period at a preset temperature" (paragraph 0008). And, in this way, "a master batch of silica-containing rubber composition having excellent dispersion of silica and good performances is obtained highly efficiently without damaging productivity" (paragraph 0008).

JP2008-138081A proposes following. It is aimed that "dispersion of silica powders are improved", thereby "processability is improved as a result of decreasing viscosity without adding processing-aiding additives" and "chipping resistance is improved" (paragraph 0005). To this ends, "in first mixing step, whole or a part of to-be-incorporated rubber component is mixed with silica and silane coupling agent to obtain a silica master batch. Then, in second mixing step, the master batch is added with remaining part of the rubber component and other ingredients other than vulcanizing chemicals. Subsequently, in last mixing step, the vulcanizing chemicals are added". Please see paragraph 0008. At the second mixing step, carbon black is added as indicated in claim 1, and all the working examples in tables 1 and 2.

JP1998 (H10)-101849A proposes following. It is aimed that "road-holding performance and running stability are improved without damaging other performances such as wear resistance and blow-out resistance (paragraph 0004)." To this end, "petroleum-derived aromatic hydrocarbon resin having certain extent of kinematic viscosity, as well as carbon black having at least 140 $m^2/g$ of specific surface area ($N_2SA$) at nitrogen-gas absorption measurement, are dispersed by wet method into a master batch having styrene-butadiene rubber and carbon black; and such master batch is incorporated into a rubber composition by a certain ratio. Please see paragraph 0005.

Each of above-mentioned JP2006-036918A, JP2008-138081A and JP1998 (H10)-101849A is considered to be intended to efficiently and uniformly disperse silica powders or other reinforcing fillers in rubber. Premise of this is presumably a perception that the silica powder or the like have to be dispersed in rubber as uniformly as possible to achieve maximum contact between the powder and the rubber, in order to achieve a required extent of low-fuel consumption. Moreover, fore-mentioned JP2008-138086A is presumably based on a premise that silica powders or other reinforcing fillers are uniformly dispersed in rubber; and brittle temperature is lowered as a result of non-compatibility among rubber components. Thus, in each of methods of the above-mentioned prior-art documents, it is a premise to uniformly or more uniformly disperse silica or other reinforcing fillers; and each of the methods is thus designed to control compatibility or miscibility among rubber or polymer components.

Meanwhile, any of the above-mentioned methods would not satisfy ever-intensifying requirements for: low-fuel-consumption and braking performance on wet-road while keeping a required level of wear resistance. Above-mentioned JP2008-138081A and JP1998 (H10)-101849A include no mention of low-fuel-consumption performance; and thus, it is assumed that methods of these documents are naturally not adequate for improving the low-fuel-consumption performance.

In view of the above, it is aimed to provide a rubber composition and its manufacturing method as well as a pneumatic tire obtainable by using such rubber composition, which enables improving of the low-fuel-consumption and wear resistances while keeping the braking performance on wet-road, or enables improving of the braking performance on wet-road while keeping the low-fuel-consumption and wear resistance.

BRIEF SUMMARY OF THE INVENTION

In course of earnest investigation in view of the above, the inventor has happened to acquire an idea of forming: a high-silica concentration phase having majority or most of silica fillers; and a low-silica concentration phase having minority or a little of the silica fillers; when to prepare a rubber composition for a tire tread or the like.

Based on the above idea, firstly, followings have been intended: the low-silica concentration phase absorbs strains at a time of deformation to decrease energy loss; and reinforcement and braking performances are maintained mainly by a network of the high-silica concentration phase. In a detailed embodiment, following procedures have been taken. At first kneader-mixing step, 60 mass % or more of rubber component, which is comprised of at least a part of to-be-charged amount of modified polymer that has a good compatibility with reinforcing fillers mainly formed of silica, is mixed with whole of to-be-charged amount of the reinforcing fillers. Obtained mixture is removed from a kneading device to give a first master batch. Then, in second kneader-mixing step, the first master batch is added solely by remaining amount of the rubber component. Obtained mixture is again removed from the kneading device to give a second master batch. Subsequently, in last kneader-mixing step, sulfur and/ or other vulcanizing agent is added to give a to-be-vulcanized rubber composition. Consequently, it has been found that excellent low-fuel-consumption and wear resistance are obtainable while keeping the braking performance on wet-road.

Thus, a rubber composition according to first aspect of the invention, in preferred embodiments, comprises a diene rubber component having 20 mass % or more of modified styrene-butadiene rubber introduced with functional groups having a hetero atom (to be referred as "hetero-modified SBR"); silica powders as reinforcing fillers, amounting 30-110 mass parts to 100 parts of the rubber component; and silane coupling agent amounting 3-15 mass % of the silica powders; said rubber composition being formed of a phase having relatively high concentration of the fillers and a phase having relatively low concentration of the fillers. The rubber composition is obtainable by a process comprising: a first kneader-mixing step, at which 60-85 mass parts of the diene rubber component including no less than 20 mass % of the hetero-modified SBR is mixed with substantially all of the reinforcing fillers along with substantially all of chemical agents for diene rubber other than vulcanizing and vulcanization-assistant agents; taking out of obtained mixture from the kneader device to give a master batch; and a second kneader-mixing step, in which the master batch is mixed substantially solely with remaining of the diene component.

A manufacturing method of rubber composition according to the first aspect, in preferred embodiments, which is comprised of adding 30-110 mass parts of silica powders as reinforcing fillers are added to 100 mass parts of diene rubber component and adding silane coupling agent by 3-15 mass % of the silica powders, comprising: a first kneader-mixing step, in which 60-85 mass parts of the diene rubber component including no less than 20 mass % of the hetero-modified SBR is mixed in a kneader device with substantially all of the reinforcing fillers; taking out of obtained mixture to give a master batch; and second kneader-mixing step, in which the master batch is mixed substantially solely with remaining mass parts or to-be-charged amount of the diene component.

Based on the above idea, secondly, followings have been intended: a polymer phase having high glass transition temperature (Tg), which is advantageous for braking performance due to high heat generation and is disadvantageous for low-fuel-consumption and wear resistance, is adopted as the low-silica-concentration phase so as to improve braking performance on wet-road while not damaging the low-fuel consumption and wear resistance. In a detailed embodiment, following procedures have been taken. Firstly, in first kneader-mixing step, no less than 85 mass % of the polymer component, which at least partly includes the modified polymer compatible with the reinforcing fillers, is mixed with all the reinforcing fillers that is mainly formed of silica powders, in a kneader device. Obtained mixture is taken out from the kneader device to give a first master batch. Subsequently, in a second kneader-mixing step, the first master batch is added substantially solely with a styrene-butadiene rubber having high glass transition temperature (Tg) in a range of −10° C. to 10° C. and having high mass-average molecular mass of no less than 900,000. Then, again, obtained mixture is taken out to give a second master batch. Hereafter, in last kneader-mixing step, sulfur or sulfur and other vulcanizing agent is added to the second master batch to give to-be-vulcanized rubber composition. Consequently, it has been found that excellent braking performance on wet-road and wear resistance are obtainable while keeping the low-fuel-consumption performance.

Thus, a rubber composition according to second aspect of the invention, in preferred embodiments, comprises a diene rubber component, which includes 20 mass % or more of modified styrene-butadiene rubber (to be referred as "hetero-modified SBR") introduced with functional groups having a hetero atom and which includes 5-15 mass % of styrene-butadiene rubber (to be referred as "high-Tg SBR") having glass transition temperature (Tg) in a range of −10° C. to 10° C. and having mass-average molecular mass of no less than 900,000; silica powders as reinforcing fillers, amounting 30-110 mass parts to 100 parts of the rubber component; and silane coupling agent amounting 3-15 mass % of the silica powders; said rubber composition being formed of a phase having relatively high concentration of the fillers and a phase having relatively low concentration of the fillers. The rubber composition is obtainable by a process comprising: a first kneader-mixing step, at which substantially all the diene rubber component other than the high-Tg SBR is mixed with substantially all of the reinforcing fillers along with substantially all of chemical agents for diene rubber other than vulcanizing and vulcanization-assistant agents; taking out of obtained mixture from the kneader device to give a master batch; and a second kneader-mixing step, in which the master batch is mixed substantially solely with the high-Tg SBR.

A manufacturing method of rubber composition according to the second aspect, in preferred embodiments, which is comprised of adding 30-110 mass parts of silica powders as reinforcing fillers to 100 mass parts of diene rubber component, which includes 20 mass % or more of the hetero-modified SBR introduced with hetero functional groups and includes 5-25 mass-% of the high-Tg SBR (having Tg in a range of −10° C. to 10° C. and having mass-average molecular mass of no less than 900,000), and adding silane coupling agent by 3-15 mass % of the silica powders, comprising: a first kneader-mixing step, at which substantially all the diene rubber component other than at least part of the high-Tg SBR that is to be added in later step is mixed with substantially all of the reinforcing fillers along with substantially all of chemical agents for diene rubber other than vulcanizing and vulcanization-assistant agents; taking out of obtained mixture from the kneader device to give a master batch; and a second kneader-mixing step, in which the master batch is mixed substantially solely with the high-Tg SBR.

DETAILED DESCRIPTION OF THE INVENTION

Hereafter, preferred embodiments of the invention are described in detail.

In the rubber composition, the diene rubber component includes the modified styrene-butadiene rubber (modified SBR) component for improving dispersion of the reinforcing fillers such as silica, by 20 mass % or more, especially in a range of 20-95 mass %, preferably in a range of 20-90 mass % or of 20-85 mass %, more preferably in a range of 30-70 mass %, still more preferably in a range of 40-60 mass %. The modified SBR is "hetero-modified SBR" that means an SBR polymer introduced with a heteroatom group (a functional group having heteroatom), for improving compatibility or chemical reactivity toward silanol groups of inorganic fillers such as silica powders. The heteroatom group is preferably at least one selected from a group consisting of hydroxyl group, amino group, carboxyl group, alkoxyl group, epoxy group, cyano group and halogen group. Such hetero-modified SBRs by themselves are known in the art, and their manufacturing method is not limited. For example, the heteroatom group may be introduced by modifying an SBR polymer obtained by anion polymerization, with modifier agent. In otherwise, monomer having the heteroatom group may be copolymerized with styrene and butadiene, which are monomers for base polymer, so as to be introduced in a polymer chain. In particular, the hetero-modified SBR may be obtained by a method disclosed in Japan's issued patent JP3488926B, for example. In otherwise, adoptable are commercial products such as: "Nipol NS616" and "Nipol N5530", which are products of Zeon Corporation, and "TUFDENE E580", a product of Asahi Kasei Chemicals Corporation. When content of the hetero-modified SBR is lower than the above range, building up of the low-silica concentration phase would be not enough and silica dispersion of the high-silica concentration phase would be not enough.

Glass transition temperature of the hetero-modified SBR is preferably no more than −10° C., more preferably in a range of −20° C. to −120° C. The glass transition temperature higher than this is disadvantageous for achieving low-fuel-consumption performance. The glass transition temperature here is that obtained by measurement using differential scanning calorimetry (DSC) according to JIS K 7121 at temperature-increase rate of 20° C./minute. The hetero-modified SBR in preferable embodiments is solution polymerized SBR (S-SBR). Generally, the S-SBR is a rubber of copolymer that is obtained by copolymerization with 1,3-butadiene and styrene using an organolithium compound as an initiator. Preferably adopted is one having styrene (St) content of 10-40 mass % and having vinyl content (Vi) of 5-70 mass % in butadiene parts. Although molecular mass (weight) of the hetero-modified SBR is not limited in particular, one having mass average molecular mass (Mw) in a range of 400,000-1,500,000 may be preferably used for example.

According to the first aspect, the diene rubber component includes natural rubber (NR) and/or isoprene rubber (IR) preferably by no less than 10 mass % and more preferably by 20-50 mass %. The diene rubber component may include not-modified SBR, butadiene rubber (BR) and/or "non-hetero-modified SBR" by 5-30 mass %. The non-hetero-modified SBR means one modified for sake of improving mechanical properties or the like, other than improving compatibility or reactivity with the silica. Such adequate content range of natural rubber (NR) and/or isoprene rubber (IR) is advantageous in achieving well-balanced reinforcement and low-fuel-consumption performance. The diene rubber component may also include diene rubbers of styrene-isoprene copolymer, butadiene-isoprene copolymer, styrene-isoprene-butadiene copolymer and/or other, unless advantageous effect of the invention is demised.

According to the second aspect, the diene rubber component includes the high-Tg SBR by 5-25 mass %, preferably by 5-20 mass %, more preferably 5-15 mass %, still more preferably 7-13 mass %. Nevertheless, at least part of the high Tg SBR that is to be added in the second kneader-mixing step, in the above, is 5-15 mass % of total amount of the diene rubber component, and is preferably 7-13 mass % of the total amount. The high Tg SBR has a glass transition temperature (Tg) by the above-described measurement, preferably in a range of −10° C. to 10° C., more preferably in a range of −10° C. to 0° C. The high Tg SBR has a mass-average molecular mass (Mw) of no less than 900,000, preferably no less than 1,000,000, more preferably no less than 1,100,000. The molecular mass (Mw) is usually not more than 2,000,000, preferably not more than 1,500,000 although upper limit of molecular mass (Mw) is not particularly limited. The molecular mass (Mw) is measured by gel filtration (permeation) chromatography (GFC or GPC) technique ("HCL-8220" of Tosoh Corporation) using tetrahydrofuran (THF) as eluent, at 40° C., and using a column of polystyrene gel and calculated as equivalent of standard polystyrenes. When the high Tg SBR has the glass transition temperature lower than −10° C., the braking performance on wet-road would not be improved; and when the glass transition temperature is higher than 10° C., it would become difficult to retain performances at low temperature (near-zero or under-zero range, for example) and wear resistance. Meanwhile, both of high Tg and high molecular mass as in the above are adopted so that, in the second kneader-mixing step, the fillers such as silica powders are difficult to be mixed into the high-Tg SBR. In this way, the braking (gripping) performance on wet-road is more efficiently exhibited. The high Tg SBR may be a single SBR polymer and may also be mixture of two or more of SBR polymers.

The styrene-butadiene rubber having high Tg may be obtained by controlling content of styrene (St) and/or vinyl (Vi) content in butadiene parts, in particular by increasing both of these styrene and vinyl contents. Following may be preferably adopted although not to be limited to such: the styrene (St) content is in a range of 35-50 mass %; and vinyl (Vi) content in butadiene parts is in a range of 55-80 mass % where the vinyl (Vi) content means content of 1,2-vinyl structure on basis of whole amount of butadiene parts as 100 mass %. The styrene and vinyl contents are measured by $^1$HNMR spectrum as calculated as ratios between areas of peaks, which are obtained by integration. The high Tg SBR in preferred embodiments is solution polymerized SBR (S-SBR), which is usually obtained by copolymerization of styrene and butadiene using organolithium compound as initiator.

In the rubber composition according to the second aspect, the diene rubber component may include other diene rubber, that is, a diene rubber other than the hetero-modified SBR and the high Tg SBR, in a range no more than 75 mass %. Glass transition temperature (Tg) of such other diene rubber is preferably in a range of −120° C. to −20° C. (i.e., −120° C.≤Tg≤−20° C.); and content of such other diene rubber in the diene rubber component is preferably in a range of 5-70 mass %, preferably in a range of 10-60 mass %, still more preferably in a range of 20-50 mass-%. When the Tg of the other diene rubber is higher than the above range, it is disadvantageous for achieving a low-fuel-consumption performance. Such other diene rubber may be solution polymerized SBR (S-SBR) or emulsion polymerized SBR (E-SBR), polybutadiene rubber (BR), natural rubber (NR), polyisoprene rubber (IR) and so on, for examples, although not limited to them. Although molecular mass of the other diene-based rubber is not limited in particular, one having mass average molecular weight (Mw) in a range of 400,000-1,500,000 is preferable, for example.

In the rubber composition according to the invention, 100 mass parts of the rubber component is added with silica powder in a range of 30 to 110 mass parts, preferably in a range of 40 to 90 mass parts or of 40 to 100 mass parts. If amount of adding the silica powders is less than 30 phr (parts to hundreds-parts-of-rubber ratio), even when a network of higher silica concentration is formed, its effect is very limited so that improving of the low-fuel-consumption performance would not be observed. If the amount of adding the silica powders is more than 110 phr, concentration of the silica powders in the high-silica-concentration phase become excessive; and thus, viscosity at a time of processing is excessively increased and a loss coefficient (tan θ) of obtained vulcanized rubber is increased. On the other hand, examples of the silica powders added into the rubber composition are wet-process silica powder, dry-process silica powders, colloidal silica powders, precipitated silica powders or the like, although not limited to them particularly. In particular, preferable is the wet-process silica powders that are mainly formed of hydrated silicate. BET specific surface area (one-point method of JIS Z8830) reflecting the average particle diameter of silica powder is preferably in a range of 90 to 250 $m^2/g$, more preferably in a range of 150 to 230 $m^2/g$.

The silane coupling agent is added into the rubber composition by 3-15 mass %, preferably by 5-10 mass %, of the amount of the silica powder. Examples of adoptable coupling agents are bis(3-triethoxysilylpropyl)tetrasulfide, bis(3-triethoxysilylpropyl)disulfide, bis(2-triethoxysilyl ethyl)tetrasulfide, 3-mercaptopropyl trimethoxy silane, 3-mercaptopropyl triethoxy silane, 3-nitropropyl trimethoxy silane, γ-aminopropyl triethoxy silane and the like.

In the rubber composition according to the invention, preferably, 5-20 mass parts of carbon black are added to 100 mass parts of the rubber component. By adding the carbon black on top of the silica or the like, wear resistance is improved. In view of the wear resistance or other performance of the vulcanized rubber, it is preferable that the nitrogen-gas absorption specific surface area ($N_2SA$: JIS K 6217-2) is in a range of 70-150 $m^2/g$ and DBP oil absorption (JIS K 6217-4) is in a range of 100-150 ml/100 g. Particularly exemplified grades of carbon black are SAF, ISAF and HAF classes.

According to manufacturing method of the rubber composition of the first aspect, in the first kneader-mixing step, 60-85 mass parts of the diene rubber component among its total to-be-charged amount of 100 mass parts are mixed with whole amount of the reinforcing fillers mainly formed of silica powders. Here, 20 mass parts or more of the above-mentioned hetero-modified SBR are included in the above 60-85 mass parts of the diene rubber component. Subsequently, obtained rubber composition is taken out from the kneader device, as a first master batch, and then recharged into the kneader device. In subsequent second kneader-mixing step, the first master batch is mixed and added in the kneader device, substantially solely with remaining parts of the diene rubber component.

According to manufacturing method of the rubber composition of the second aspect, in the first kneader-mixing step, 75-95 mass parts of the diene rubber component among its total to-be-charged amount of 100 mass parts are mixed with whole amount of the reinforcing fillers mainly formed of silica powder. Here, 20 mass parts or more of the above-mentioned hetero-modified SBR are included in the above 75-95 mass parts of the diene rubber component. In the first kneader-mixing step, the high-Tg SBR may be added by less than 10 mass parts, preferably by less than 8 mass parts. Subsequently, obtained rubber composition is taken out from the kneader device, as a first master batch, and then recharged into the kneader device. In subsequent second kneader-mixing step, the first master batch is mixed and added in the kneader device, substantially solely with the high-Tg SBR.

For a conventional rubber composition having the silica powders, two or more kneader-mixing steps have been taken in general, to improve dispersion of the silica powders and facilitate reaction between the silane coupling agent and the silica powders. Thus, even with plural kneader-mixing steps as in the above, productivity is considered to be same or almost same with conventional processes.

In the first kneader-mixing step, silica powders are considered to be being progressively and uniformly dispersed into the hetero-modified SBR. Even when the other diene rubber component, which is other than the hetero-modified SBR, is added in the first kneader-mixing step, the hetero-modified SBR is mixed with the other diene rubber component if these are compatible with each other; and thus, the silica powders or other fillers would be uniformly dispersed into the rubber composition.

In the second kneader-mixing step of the first aspect, the first master batch having the fillers in relatively high concentration is mixed substantially solely with the remaining and relatively smaller amount of the diene rubber component. Moreover, the first master batch is taken out from the kneader device and cooled, to 50° C. or lower for example, and then charged into the kneader device. Thus, under a condition that vulcanizing agent is yet to be added, rubber of the first maser batch would not easily miscible with or intermixed with later-added diene rubber—that is, diene rubber that has been added in later step. Moreover, the hetero-modified SBR included in the first master batch has reacted with the silica powders or other similar fillers to form linkages in some extent; and thus, the silica powders or the like would be difficult to be distributed into the later-added rubber.

In the second kneader-mixing step of the second aspect, the first master batch having the fillers in relatively high concentration is mixed substantially solely with relatively smaller amount of the high-Tg SBR. Moreover, the first master batch is taken out from the kneader device and cooled, to 50° C. or lower for example, and then charged into the kneader device. Thus, under a condition that vulcanizing agent is yet to be added, rubber of the first maser batch would not be easily miscible or intermixed with later-added diene rubber—that is, diene rubber that has been added in later step. Especially in a condition that the high-Tg SBR having high molecular mass is added by relatively small amount, a rubber-composition part derived from the first master batch would not become easily intermixed with a rubber-composition part as the later-added diene rubber. Moreover, the hetero-modified SBR included in the first master batch has already reacted with the silica powder or other similar fillers to form linkages in some extent; and thus, the silica powder or the like would be difficult to be distributed into the rubber-composition part as the later-added diene rubber.

Consequently, when ordinary kneader-mixing condition for manufacturing tire's rubber members or the like is adopted, the rubber-composition part, which has high concentration of the silica powder or the like and is derived from the first master batch, forms a phase separate with a phase of the rubber-composition part that has little of the fillers or the like and is derived from the later-added diene rubber. Because the rubber-composition part that is derived from the first master batch is larger in quantity, and thus is considered to form a continuous phase, in general. Meanwhile, the later-added diene rubber that does not have the fillers is considered to form islands, or another continuous phase, or partly continuous phases. In the second kneader-mixing step, even when the rubber-composition part that is derived from the first master batch is partly intermixed or misced with the later-added diene rubber, two separate phases are considered to be remaining as a whole. Namely, the high-silica-concentration phase and a phase having little or a low concentration of the silica powders are remained in the rubber composition obtained after the second kneader-mixing step.

preferably, after completing the second kneader-mixing step, obtained mixture is again taken out to give a second master batch. Thereafter, in third kneader-mixing step, sulfur and vulcanization accelerators are added. The third kneader-mixing step is terminated at a timepoint that the sulfur and vulcanization accelerators are uniformly mixed into the rubber composition. Thus, the high-silica-concentration phase and the low-silica concentration phase are retained as separate phases. To-be-vulcanized rubber composition thus obtained is fed into a cavity of rubber molding forms to produce rubber products.

As a kneader device for the first to third kneader-mixing steps, any one among those generally used in mixing of the rubber composition may be used without particular limitation. For examples, a Banbury mixer, a rolling mill, an extruder, a rubber kneader and the like may be used. It is required to fully facilitate reaction of the coupling agent, and thus, temperature of the rubber in the first kneader-mixing step is required to reach 140-170° C. for example. When the Banbury mixer or other mixers that are tightly sealable is used, spontaneous heat generation due to kneading and mixing makes temperature of the rubber spontaneously increase upto a temperature such as in a range of 140-170° C. at a time of completing the kneading and mixing. In other words, when the Banbury mixer or the like is used, no heating mechanism other than the kneading mechanism is needed, and uniform temperature increase is achieved throughout whole mass. Thus, such mixer is preferable. The second and third kneader-mixing steps may be implemented by the kneader device same as that used in the first step, and also by other kneader device. For example, it is adoptable that: the Banbury mixer is used in the first step while a twin-screw extruder is used in the second and third kneader-mixing steps.

Amount of charging the hetero-modified SBR in the first kneader-mixing step is preferably no less than 30 mass parts, more preferably in a range of 40-70 mass parts, still more preferably in a range of 50-60 mass parts, among 100 parts of the diene-rubber component as its total of to-be-charged amounts. In forming the high-silica-concentration phase in which silica powder is satisfactorily dispersed, it is preferable that amount of the hetero-modified SBR is large to some extent.

In the second kneader-mixing step of the first aspect, among 100 parts of the diene rubber component as total of to-be-charged amount, preferably 15-40 mass parts of the diene rubber component is charged into the kneader device. In preferred embodiments, the diene rubber being added in the second kneader-mixing step is same with that charged in the first kneader-mixing step, and preferably is mainly formed of natural rubber (NR) and/or isoprene rubber (IR). By adding rubber component same with that of first kneader-mixing step is added in the second kneader-mixing step; a rubber phase of the first master batch, in which silica powders and carbon black are dispersed, is intermixed to some extent with the rubber added in the second kneader-mixing step. Thus, adhesion strength between two rubber phases increases; and therefore, such is preferable to maintain reinforcing performance. Moreover, adding a rubber mainly formed of the natural rubber (NR) and/or isoprene rubber (IR) is preferable in improving a balance between the reinforcing performance and low-fuel-consumption.

In the second kneader-mixing step of the second aspect, added are 5-15 mass parts of the high-Tg SBR among 100 mass parts as total of to-be-charged amount of the diene rubber component.

Preferably, the rubber composition according to the invention, which is obtained after the second kneader-mixing step, is taken out from the kneader device, and then is properly stored as a second master batch. Thereafter, the second master batch is subjected to third kneader-mixing step, in which a vulcanizing agent such as sulfur as well as a vulcanizing accelerator such as guanidine, thiazole, sulfonamide and thiuram compounds are added, before obtaining a rubber element as a rubber product. By having the third kneader-mixing step for adding the vulcanizing agent and accelerator; even in the second kneader-mixing step, reactions would be fully facilitated between the silica and the silane coupling agent and between the silica and functional group of the hetero-modified SBR; and to this end, temperature at a time of discharge may be set in a range of 140-170° C.

In the above-mentioned first kneader-mixing step, any one or more of additives in various kinds generally used for rubber may be added, except for the vulcanizing agent and accelerator, along with the silica powder and/or carbon black. For example, antioxidants (amine-ketone, aromatic secondary amine, phenol and/or imidazole compounds or the like), zinc white, oil, wax, stearic acid, plasticizers, resins or the like may be added in an ordinary range, as suitably to a situation arisen. Meanwhile, as the fillers other than the silica powders and the carbon black, hard particles such as walnut powders or other lingo-cellulosic powders may be added.

The rubber composition discharged after the third kneader-mixing step according to the invention, is subjected to a vulcanization molding process to give a prescribed rubber element or product. A tire according to the invention may be manufactured by followings for example: the rubber composition derived from the third kneader-mixing step is used for molding the tread part of the tire in a rubber extruder or the like; and then a to-be-vulcanized tire is formed and is subsequently subjected to vulcanization process in accordance with ordinary method. When to use the rubber composition in manufacturing a studless tire having a cap-base structure, the rubber composition according to the invention may be used only to a cap tread on tread face.

EXAMPLES

Examples according to the invention are given below whereas the invention is no way to be limited to these examples. Units for charging amount of each component are mass parts, on tables below in respect of each mixing step. Mere mentioning of mass parts indicates a value based on assuming a total amount of diene rubber as 100 mass parts.

Materials for the rubber composition, which are shown in either of table 1 (first embodiment) and table 2 (second embodiment), were charged or added into a Banbury mixer having a volume of 1.7 liter, which was used as a kneader device, in accordance with formulations shown in the tables, and were subjected to the first, second and third kneader-mixing steps. For the first and second kneader-mixing steps, mixing was made until reaching 160° C., and then immediately taken out from the kneader device. For the third kneader-mixing step, discharge was made in a temperature no more than 90° C. Namely, in accordance with formulations shown in Table 1 or 2, first master batch was prepared through the first kneader-mixing step that is for forming the high-silica-concentration phase and was taken out from the kneader device. Then, in the second kneader-mixing step, only the rubber component was added to the first master batch; and again, obtained mixture was taken out from the kneader device to give the second master batch. Thereafter, in the third kneader-mixing step, vulcanizing agent and accelerator were solely added. In this way, to-be-vulcanized rubber compositions of the examples and comparative examples shown in the Table 1 or 2 were obtained. In the formulations shown in the Table 2 for the second embodiment, amount of oil-extended SBR is shown by amount (mass parts) including oil and is also shown in parenthesis by amount of polymer itself without the oil.

Details of materials shown in the tables are indicated below.

Modified S-SBR (1): "Nipol NS616" of Zeon Corporation, (solution-polymerized styrene-butadiene rubber, glass transition temperature Tg=−25° C., bound styrene content=21 mass %, hydroxyl group is introduced to polymer terminals), Modified S-SBR (2): "HPR340" of JSR Corporation, (solution-polymerized styrene-butadiene rubber, Tg=−58° C., the bound styrene content=10 mass %, alkoxy and amine groups are introduced to polymer terminals), High-Tg S-SBR (1): "SE6529", a product of Sumitomo Chemical Co., Ltd. (solution-polymerized styrene-butadiene rubber, Tg=−4° C., bound styrene content=43 mass %, mass average molecular weight Mw=1,200,000, oil extension 44.0 phr), High-Tg S-SBR (2): "SE6233", a product of Sumitomo Chemical Co., Ltd. (solution-polymerized styrene-butadiene rubber. Tg=−2° C., bound styrene content=40 mass %, mass average molecular weight Mw=1,160,000, oil extension 37.5 phr), Butadiene rubber (BR): "BR01", a product of JSR Corporation (Tg=−102° C.), Nonmodified E-SBR (1): "SBR1723", a product of JSR Corporation (emulsion polymerized styrene-butadiene rubber, Tg=−53° C., bound styrene content=23.5 mass %, oil extension 37.5 phr), Nonmodified E-SBR (2): "SBR0122", a product of JSR Corporation (emulsion polymerized styrene-butadiene rubber, Tg=−40° C., bound styrene content=37 mass %, oil extension 34.0 phr), Natural rubber: RSS#3 (Tg=−60° C.), Silica: "Nipsil AQ", a product of Tosoh Co., Ltd. (nitrogen adsorption specific surface area BET=ca.205 m$^2$/g)

Carbon Black: "N339 SEAST KH", a product of Tokai Carbon Co., Ltd. (HAF-HS class, nitrogen adsorption specific surface area BET=ca.90 m$^2$/g)

Silane coupling agent: "Si69", a product of Evonik Degussa GmbH;

Oil: "process NC140", a product of Japan Energy Corporation,

Stearic acid: "Lunac S-20", a product of Kao Corporation,

Zinc white: "Zinc white No. 1", a product of Mitsui Mining & Smelting Co., Ltd., Antioxidant: "Antigen 6C", a product of Sumitomo Chemical Co., Ltd., Wax: "Sunnock N", a product of Ouchi Shinko Chemical Industrial Co., Ltd., Vulcanization accelerator (1): dibenzo thiazolyl disulfide ("Sanceler DM-G", a product of Sanshin Chemical Industry Co., Ltd.), Vulcanization accelerator (2): N-cyclohexyl-2-benzothiazolyl sulfenamide ("Soccinol CZ", a product of Sumitomo Chemical Co., Ltd.), Sulfur: "5% oil treated powder sulfur 5%", a product of Tsurumi Chemical Industry Co., Ltd.

First Embodiment

TABLE 1

| | Table 1-1 | | | | | | Table 1-2 | | Table 1-3 | | Table 1-4 | |
| --- | --- | --- | --- | --- | --- | --- | --- | --- | --- | --- | --- | --- |
| | Com. Ex. 1 | Ex. 1 | Ex. 2 | Ex. 3 | Com. Ex. 2 | Com. Ex. 3 | Com. Ex. 4 | Ex. 4 | Com. Ex. 5 | Ex. 5 | Com. Ex. 6 | Com. Ex. 7 |
| 1st kneader-mixing | | | | | | | | | | | | |
| Modified S-SBR(1) | 60 | 60 | 40 | 30 | 60 | 10 | 40 | 40 | | | | |
| Modified S-SBR(2) | | | | | | | | | 60 | 40 | | |
| Natural rubber | 40 | 20 | 40 | 40 | 35 | 40 | 40 | 40 | 40 | 40 | 40 | 20 |
| Non-modified E-SBR(1) | | | | | | | 27.5 | | | | | |
| Non-modified E-SBR(2) | | | | | | | | | | | 80.4 | 80.4 |
| Carbon black | 5 | ← | ← | ← | ← | ← | ← | ← | 5 | ← | 5 | ← |
| Silica powder | 60 | ← | ← | ← | ← | ← | ← | ← | 70 | ← | 60 | ← |
| Coupling agent | 4.8 | ← | ← | ← | ← | ← | ← | ← | 5.6 | ← | 4.8 | ← |
| Oil | 10 | ← | ← | ← | ← | ← | 2.5 | ← | 10 | ← | 0 | ← |
| Stearate | 2 | ← | ← | ← | ← | ← | ← | ← | 2 | ← | 2 | ← |
| Zinc white | 2 | ← | ← | ← | ← | ← | ← | ← | 2 | ← | 2 | ← |
| Antioxidant | 2 | ← | ← | ← | ← | ← | ← | ← | 2 | ← | 2 | ← |
| Wax | 2 | ← | ← | ← | ← | ← | ← | ← | 2 | ← | 2 | ← |
| 2nd kneader-mixing | | | | | | | | | | | | |
| 1st master batch | 187.8 | 167.8 | 167.8 | 157.8 | 182.8 | 137.8 | 187.8 | 160.3 | 198.6 | 178.6 | 198.2 | 178.2 |
| Natural rubber | | 20 | | | 5 | | | | | | | 20 |
| Modified S-SBR(1) | | | 20 | 30 | | 50 | | | | 20 | | |
| Non-modified E-SBR(1) | | | | | | | | 27.5 | | | | |
| 3rd kneader-mixing | | | | | | | | | | | | |
| 2nd master batch | 187.8 | ← | ← | ← | ← | ← | ← | ← | 198.6 | ← | 198.2 | ← |
| Accelerator (1) | 2.0 | ← | ← | ← | ← | ← | ← | ← | ← | ← | ← | ← |
| Accelerator (2) | 1.5 | ← | ← | ← | ← | ← | ← | ← | ← | ← | ← | ← |
| Sulfur | 2.0 | ← | ← | ← | ← | ← | ← | ← | ← | ← | ← | ← |
| Note | Remixing only | NR 20 pt. add. | SBR 20 pt. add. | SBR 30 pt. add. | Too small add. | Too large add. | ESBR 20 pt. add. | | Other M-SBR/more | SBR 20 pt. add. | No M-SBR | NR 20 pt. add. |

TABLE 1-continued

|  | Table 1-1 | | | | | Table 1-2 | | Table 1-3 | | Table 1-4 | |
| --- | --- | --- | --- | --- | --- | --- | --- | --- | --- | --- | --- |
|  | Com. Ex. 1 | Ex. 1 | Ex. 2 | Ex. 3 | Com. Ex. 2 | Com. Ex. 3 | Com. Ex. 4 | Ex. 4 | Com. Ex. 5 silica | Ex. 5 | Com. Ex. 6 | Com. Ex. 7 |
| Braking on wet-road | 100 | 101 | 99 | 99 | 100 | 101 | 100 | 98 | 100 | 100 | 100 | 101 |
| Low-heat generation | 100 | 115 | 108 | 110 | 100 | 94 | 100 | 109 | 100 | 110 | 100 | 102 |
| Wear resistance | 100 | 103 | 101 | 104 | 100 | 95 | 100 | 101 | 100 | 103 | 100 | 101 |

To-be-vulcanized rubber composition obtained after the third kneader-mixing step was vulcanized by heating at 160° C. for 30 minutes, to prepare test pieces shaped as designated. By use of obtained test pieces, braking on wet-road, low-heat generation (low-fuel-consumption) and wear resistance were evaluated. Evaluation methods are as follows. Each of evaluation results is expressed as "index" or ratio by assuming a value of comparative example 1 as 100 in Table 1-1, by assuming a value of comparative example 4 as 100 in Table 1-2, by assuming a value of comparative example 5 as 100 in Table 1-3, and by assuming a value of comparative example 6 as 100 in Table 1-4.

Braking performance on wet-road: by using a Lupke rebound resilience tester, rebound resilience (%) was measured at 23° C., in accordance with JIS K 6255. Reciprocals of measured values were obtained and shown by the indexes as explained above. The larger the index is, the better the braking performance on wet-road is.

Low-fuel-consumption index: by using a viscoelasticity testing machine, a product of Toyo Seiki Seisaku-sho, LTD, tan δ was measured at a condition of 10 Hz frequency, 1% dynamic strain and at 60° C. Reciprocals of measured values were obtained and shown by the indexes as explained above. The larger the index is, the better the low-fuel-consumption performance is.

Wear resistance: Using a test piece of vulcanized rubber composition, abrasion amount was measured by Lambourn abrasion test machine in accordance with JIS K 6264. Standard conditions are set as follows: slip ratio is 30%, applied load is 40N, amount of falling sands is 20 g/min. Reciprocals of abrasion amounts were obtained and shown by the indexes as explained above. The larger the index is, the better the wear resistance is.

Results are shown in Table 1. In Examples 1 to 4, adequate amounts of the modified SBR and natural rubber were used as the diene rubber component and the either one of these rubbers was added in the second kneader-mixing step. Resultantly, by the Examples 1 to 4, low-heat-generation performance directly related to the low-fuel-consumption performance was improved while maintaining the braking performance on wet-road, when compared to Comparative examples 1 and 4. Moreover, wear resistance was improved or maintained. Particularly, in Example 1, the modified S-SBR makes 60 mass parts among the total 100 mass parts of the diene rubber component, and natural rubber makes remaining 40 mass parts, half of which were charged or added in each of the first and second kneader-mixing steps. Resultantly, by Example 1, most excellent value of the low-fuel-consumption performance was obtained.

In Examples 2 to 3, the modified S-SBR makes 60 mass % of the diene rubber component and natural rubber makes remaining 40 mass %, same as in Example 1. Nevertheless, in the second kneader-mixing step, only the modified S-SBR was added instead of the natural rubber. Resultantly, the low-heat-generation performance was somewhat inferior to that of Example 1. Example 2, in which 20 mass parts of the modified S-SBR was added, seems to be slightly preferable in the low-fuel-consumption and wear resistance than Example 3, in which 30 mass parts of the modified S-SBR was added. This is presumably due to that: when the modified S-SBR is added in the second kneader-mixing step, silica powders are distributed also in the later added rubber; and thus, percentage of the silica powders in the high-silica-concentration phase is decreased.

In Comparative example 2, in the second kneader-mixing step, the natural rubber amounting 5 mass % of the total diene rubber component was solely added. Resultantly, the Comparative example 2 was equivalent with the Comparative examples 1 and 4, in respect of all of evaluation results. This is presumably due to that: volume ratio of low-silica-concentration phase is too small and thus, silica-powders network structure would not be affected by the low-silica-concentration phase. Meanwhile, in Comparative example 3, the modified SBR amounting 50 mass % of the total diene rubber component was added in the second kneader-mixing step. Compared with the Comparative examples 1 and 4, the Comparative example 3 was equivalent only in respect of the braking performance on wet-road and inferior in respect of the low-heat generation and wear resistance. This is presumably due to that: in the Comparative example 3, amount of the modified SBR is too small and amount of the silica powder is too large compared to the polymer component, in the first kneader-mixing step; and therefore, sufficient dispersion of the silica powder is not achievable.

Formulation of Example 4 was changed from the formulation of Example 2, only by replacing OH-modified S-SBR with non-modified E-SBR. Resultantly, obtained were results almost same with those of the Example 2. This indicates that diene rubber other than natural rubber (Example 1) or the modified SBR also makes effect similar with these, as the later added diene rubber in the second kneader-mixing step.

Formulation of Example 5 was changed from the formulation of Example 2, only in following: OH-modified S-SBR was replaced by alkoxy- and amine-groups modified S-SBR; and amount of the silica powder was increased from 60 mass parts to 70 mass parts. Resultantly, obtained were results almost same with those of the Example 2.

In Comparative examples 6 and 7, non-modified E-SBR (1) was used. In Comparative example 7, even if natural rubber was added in the second kneader-mixing step, results were almost same with those of Comparative example 6, in which manner of charging and mixing was conventional. This is presumably due to that: when the modified S-SBR was not included in the rubber charged in the first kneader-mixing step, large amount of the silica powder is also distributed in the later added diene rubber in the second kneader-mixing step; and thus, the formation of the high-silica-concentration phase would be not sufficient and resultantly, the rubber composition almost same with that of the Comparative example 6 (conventional charging and mixing) was obtained.

As seen from results of the examples and comparative examples in the above, the low-heat-generation and wear resistance are obtained while maintaining the braking performance on wet-road, when the styrene-butadiene rubber introduced with hetero atom groups is used as at least part of the diene rubber component, and kneader-mixing before adding the vulcanizing agent is made by two stages in accordance with specified formulations.

Second Embodiment and 2-3, the indices assuming the comparative example 2-2 in Table 2-1 as 100 are also shown in parentheses.

Braking performance on wet-road: by using a Lupke rebound resilience tester, rebound resilience (%) was measured at 23° C., in accordance with JIS K 6255. Reciprocals of measured values were obtained and shown by the indexes as explained above. The larger the index is, the better the braking performance on wet-road is.

Low-fuel-consumption index: by using a viscoelasticity testing machine, a product of Toyo Seiki Seisaku-sho, LTD, tan δ was measured at a condition of 10 Hz frequency and 1% dynamic strain and at 60° C. Reciprocals of measured values were obtained and shown by the

TABLE 2

|  | Table 2-1 | | | | | Table 2-2 | | | Table 2-3 | |
| --- | --- | --- | --- | --- | --- | --- | --- | --- | --- | --- |
|  | Com. Ex. 2-1 | Com. Ex. 2-2 | Ex. 2-1 | Ex. 2-2 | Com. Ex. 2-3 | Com. Ex. 2-4 | Ex. 2-3 | Com. Ex. 2-5 | Com. Ex. 2-6 | Com. Ex. 2-7 |
| 1st kneader-mixing | | | | | | | | | | |
| OH modified S-SBR (1) | 60 | 50 | 50 | 50 | 60 | 40 | 40 | 40 | | |
| BR | 40 | 40 | 40 | 40 | 30 | 40 | 40 | 40 | 40 | 40 |
| High Tg-S-SBR (1) | | 14.4 (10) | | | | 28.8 (20) | 10.1 (7) | | 10 | |
| High Tg-S-SBR (2) Nonmodfied | | | | | | | | | | |
| E-SBR (2) | | | | | | | | | 67 (50) | 67 (50) |
| Carbon black | 5 | ← | ← | ← | ← | ← | ← | ← | ← | ← |
| Silica powder | 70 | ← | ← | ← | ← | ← | ← | ← | ← | ← |
| Coupling agent | 5.6 | ← | ← | ← | ← | ← | ← | ← | ← | ← |
| Oil | 20 | 15.6 | ← | 16.2 | 20 | 11.2 | ← | ← | 3.6 | ← |
| Stearate | 2 | ← | ← | ← | ← | ← | ← | ← | ← | ← |
| Zinc white | 2 | ← | ← | ← | ← | ← | ← | ← | ← | ← |
| Antioxidant | 2 | ← | ← | ← | ← | ← | ← | ← | ← | ← |
| Wax | 2 | ← | ← | ← | ← | ← | ← | ← | ← | ← |
| 2nd kneader-mixing | | | | | | | | | | |
| 1st master batch | 208.6 | 208.6 | 194.2 | 194.8 | 198.6 | 208.6 | 189.9 | 179.8 | 208.6 | 194.2 |
| High Tg-S-SBR (1) | | 14.4 (10) | | | | | 18.7 (13) | 28.8 (20) | | 14.4 (10) |
| High Tg-S-SBR (2) | | | | 13.8 (10) | | | | | | |
| BR | | | | | 10 | | | | | |
| 3rd kneader-mixing | | | | | | | | | | |
| 2nd master batch | 208.6 | ← | ← | ← | ← | ← | ← | ← | ← | ← |
| Accelerator (1) | 2.0 | ← | ← | ← | ← | ← | ← | ← | ← | ← |
| Accelerator (2) | 1.5 | ← | ← | ← | ← | ← | ← | ← | ← | ← |
| Sulfur | 2.0 | ← | ← | ← | ← | ← | ← | ← | ← | ← |
| Note | No high Tg SBR | Remixing only | Later add. highTg SBR | Later add. highTg SBR | Later add. BR | Remixing only | More high Tg SBR | High Tg SBR excess | No modified polymer | |
| Braking on wet-road | 88 | 100 | 106 | 107 | 87 | 100 (123) | 108 (133) | 111 (136) | 100 (103) | 102 (104) |
| Low-heat generation | 105 | 100 | 102 | 101 | 106 | 100 (94) | 100 (94) | 94 (88) | 100 (93) | 101 (92) |
| Wear resistance | 101 | 100 | 105 | 103 | 100 | 100 (78) | 104 (81) | 97 (76) | 100 (96) | 100 (96) |

To-be-vulcanized rubber composition obtained after the third kneader-mixing step was vulcanized by heating at 160° C. for 30 minutes, to prepare test pieces shaped as designated. By use of obtained test pieces, braking on wet-road, low-heat generation (low-fuel-consumption) and wear resistance were evaluated. Evaluation methods are as follows. Each of evaluation results is expressed as "index" or ratio by assuming a value of comparative example 2-2 as 100 in Table 2-1, by assuming a value of comparative example 2-4 as 100 in Table 2-2, and by assuming a value of comparative example 2-6 as 100 in Table 2-3. For facilitating comparison, in Tables 2-2 indexes as explained above. The larger the index is, the better the low-fuel-consumption performance is.

Wear resistance: Using a test piece of vulcanized rubber composition, abrasion amount was measured by Lambourn abrasion test machine in accordance with JIS K 6264. Standard conditions are set as follows: slip ratio is 30%, applied load is 40N, amount of falling sands is 20 g/min. Reciprocals of abrasion amounts were obtained and shown by the indexes as explained above. The larger the index is, the better the wear resistance is.

Results are shown in Table 2. In Examples 2-1 and 2-2, relatively large amount of the OH-modified S-SBR was charged in the first kneader-mixing step, and adequate amount of high-TG SBR was added in the second kneader-mixing step. Resultantly, when compared with Comparative examples 2-1 and 2-2, in which no diene rubber was added; remarkable increase in the braking performance on wet-road and small increase in the wear resistance were achieved; while the low-heat-generation performance, which is directly related to the low-fuel-consumption performance, was maintained almost entirely. In Examples 2-1 and 2-2, similar ones of the high-Tg SBR were used; and obtained results are similar.

In Comparative example 2-2, the high-Tg SBR was used but added in the first kneader-mixing step. Thus, effect of improving the braking performance on wet-road was not sufficient while the braking performance on wet-road is increased when compared with Comparative example 2-1, in which the high-Tg SBR was not charged or added. Moreover, in respect of the low-heat-generation performance, the Comparative example 2-2 was considered to be somewhat inferior to the Example 2-1. This is presumably due to that: silica powders as fillers were distributed in the high-Tg SBR, and almost no high-silica-concentration phase was formed.

In Comparative example 2-3, the high-Tg SBR was not used and relatively small amount (10 mass %) of butadiene rubber (BR) was added in the second kneader-mixing step. Resultantly, obtained results were almost same with those of the Comparative example 2-1. This is presumably due to that: when butadiene rubber (BR) is added, 10 mass % of addition is not enough to form the low-silica-concentration phase for achieving required performances.

In Table 2-2, which is a portion of the Table 2 and shows Comparative examples 2-4 and 2-5 and Example 2-3, amount of the high-Tg SBR was set at 20 mass % of the total diene rubber. Formulation of Comparative example 2-4 was changed from that of Comparative example 2-2 only by doubling the amount of high-Tg SBR. Resultantly, when compared to results of Comparative example 2-2, the braking performance on wet-road was superior but the low-heat-generation and wear resistance were inferior. In Example 2-3, a portion of the high-Tg SBR was charged in the first kneader-mixing step; and in the second kneader-mixing step, the high-Tg SBR of less than 15 mass % to the total diene rubber was charged. Resultantly, remarkable increase in the braking performance on wet-road and increase in the wear resistance were achieved while maintaining the low-heat-generation performance when compared to results of the Comparative example 2-4, in which all the high-Tg SBR was charged in the first kneader-mixing step although total amount of the high-Tg SBR was same with the Example 2-3.

In Comparative example 2-5, all the high-Tg SBR was added in the second kneader-mixing step by 20 mass % of the total diene rubber. Resultantly, although the braking performance on wet-road was excellent, the low-heat-generation performance was remarkably lower and the wear resistance was somewhat lower when compared to results of the Comparative example 2-4. Difference between results of these Comparative examples is presumably due to following. When the high-Tg SBR is added in the second kneader-mixing step by large amount of 20 mass % of the total diene rubber as in the Comparative example 2-5, the low-silica-concentration phase formed of the high-Tg SBR would become excessive in volume; and therefore, a balance was damaged between the braking performance on wet-road and performances of the low-heat-generation and wear resistance.

In formulations of Table 2-3, which is a portion of the Table 2 and shows Comparative examples 2-6 and 2-7, the hetero-modified SBR are not used and non-modified E-SBR was used instead of the hetero-modified SBR. Results of Comparative example 2-7 were almost same with those of the Comparative example 2-6, in which manner of charging and mixing was conventional, although 10 mass % of the high-Tg SBR was added in the second kneader-mixing step for the Comparative example 2-6. This is presumably due to following. Unless the hetero-modified SBR is used, even when adequate amount of the high-Tg SBR is added in the second kneader-mixing step, silica powders or other fillers would not fully concentrate on one of the two rubber phases. Therefore, obtained rubber composition would have become similar to that of the conventional one (Comparative example 2-6).

As seen from results of the Examples and Comparative examples of the second embodiment as in above, the braking performance on wet-road is increased while maintaining the low-heat-generation and wear resistance when: the styrene-butadiene rubber introduced with the hetero atom groups and the styrene-butadiene rubber having high glass transition temperature were used as at least part of the diene rubber component; and two stages of kneader-mixing is made before adding the vulcanizing agent in accordance with certain formulations.

Pneumatic tires according to the invention may be mounted and used for light trucks, for large vehicles such as trucks and buses and for various kinds of vehicles irrespective of tire sizes.

What is claimed is:

1. A manufacturing method of rubber composition, which is comprised of adding 40-110 mass parts of silica powders as reinforcing fillers to 100 mass parts of diene rubber component and adding silane coupling agent by 3-15 mass % of the silica powders, comprising:
    preparing styrene-butadiene rubber modified with a functional group(s) having hetero atom, as hetero-modified SBR, which is to make 20-95 mass % of said 100 mass parts or total of the diene rubber component, in the rubber composition, wherein said functional group(s) is at least one selected from the group consisting of hydroxyl group, amino group, carboxyl group, alkoxyl group, epoxy group, cyano group, and halogen group;
    preparing styrene-butadiene rubber having glass transition temperature in a range of −10° C. to 10° C. and having mass-average molecular mass of no less than 900,000, as high-Tg SBR, which is to make 5-25 mass % of said 100 mass parts or total of the diene rubber component, in the rubber composition;
    a first kneader-mixing step, at which 80-95 mass parts of the diene rubber component including at least 20 mass parts of the hetero-modified SBR is mixed with substantially all of the reinforcing fillers;
    taking out of obtained mixture from the kneader device to give a first master batch; and
    a second kneader-mixing step, in which the first master batch is mixed substantially solely with 5-15 mass parts of the high-Tg SBR,
    wherein the high-Tg SBR has a glass transition temperature in a range of −10° C. to 0° C.

2. A manufacturing method of pneumatic tire, wherein the rubber composition obtainable obtained by a method according to claim 1 is used for a tread.

3. A manufacturing method of rubber composition according to claim 1, wherein no rubber component other than the hetero-modified SBR substantially has said functional group.

4. The method according to claim 2, wherein the hetero-modified SBR has a glass transition temperature in a range of −20° C. to −120° C.; and if a diene rubber other than the hetero-modified SBR and the high-Tg SBR is included in the diene rubber component, glass transition temperature (Tg) of such other diene rubber is also in a range of −120° C. to −20° C.

5. The manufacturing method according to claim 1, wherein the hetero-modified SBR has a glass transition temperature in a range of −20° C. to −120° C.; and if a diene rubber other than the hetero-modified SBR and the high-Tg SBR is included in the diene rubber component, glass transition temperature (Tg) of such other diene rubber is also in a range of −120° C. to −20° C.

6. The manufacturing method according to claim 1, wherein the high-Tg SBR has a styrene (St) content in a range of 35-50 mass % and a vinyl (Vi) content in butadiene parts in a range of 55-80 mass %.

7. The manufacturing method according to claim 1, wherein the first master batch is taken out from the kneader device and cooled, to 50° C. or lower, and then charged into the kneader device;

after a second kneader-mixing step, a second master batch is taken out from the kneader device; and then, sulfur and a vulcanizing accelerator are added in a third kneader-mixing step.

8. The manufacturing method according to claim 3, wherein amount of charging the hetero-modified SBR in the first kneader-mixing step is 40-70 mass parts among 100 parts of the diene-rubber component.

9. The manufacturing method according to claim 5, wherein a diene rubber other than the hetero-modified SBR and the high Tg SBR is SBR other than the hetero-modified SBR and the high-$T_g$ SBR, polybutadiene rubber (BR), natural rubber (NR) or polyisoprene rubber (IR) and included in the diene rubber component by 20-50 mass %.

* * * * *